US010728319B2

(12) United States Patent
Newton

(10) Patent No.: US 10,728,319 B2
(45) Date of Patent: Jul. 28, 2020

(54) CDN-BASED CLIENT MESSAGING

(71) Applicant: Level 3 Communications, LLC, Broomfield, CO (US)

(72) Inventor: Christopher Newton, Westlake Village, CA (US)

(73) Assignee: Level 3 Communications LLC, Broomfield, CO (US)

( * ) Notice: Subject to any disclaimer, the term of this patent is extended or adjusted under 35 U.S.C. 154(b) by 197 days.

(21) Appl. No.: 15/725,898

(22) Filed: Oct. 5, 2017

(65) Prior Publication Data
US 2019/0109898 A1    Apr. 11, 2019

(51) Int. Cl.
*H04L 29/08*    (2006.01)
*H04L 12/761*    (2013.01)
*H04L 29/06*    (2006.01)

(52) U.S. Cl.
CPC .......... *H04L 67/1021* (2013.01); *H04L 45/16* (2013.01); *H04L 67/2842* (2013.01); *H04L 67/42* (2013.01)

(58) Field of Classification Search
CPC ..... H04L 67/10; H04L 67/1021; H04L 67/42; H04L 45/16
USPC ........................................................ 709/217
See application file for complete search history.

(56) References Cited

U.S. PATENT DOCUMENTS 9,152,970 B1 * 10/2015 Trahan .................. G06Q 30/02
9,383,958 B1 *  7/2016 Trahan ...................... G06F 3/14
2007/0288710 A1 * 12/2007 Boyd ................... G06F 11/2069 711/162
2010/0257451 A1 * 10/2010 Halevi ..................... G06F 15/16 715/733
2011/0066652 A1 *  3/2011 Piepenbrink ....... H04N 7/17318 707/783
2014/0149578 A1 *  5/2014 Goldman ................. H04L 45/02 709/224
2015/0149504 A1 *  5/2015 Sosna .................... G06F 16/957 707/770
2015/0254222 A1 *  9/2015 Shadfar ................. G06F 40/169 715/230
2017/0034659 A1 *  2/2017 Shnitzer ................. H04W 4/023
2019/0007373 A1 *  1/2019 Slobodskyy ........ H04L 63/0227

OTHER PUBLICATIONS

Anna MacLachlan, "Why you should use a content delivery network," Mar. 2015, fastly.com, www.fastly.com/blog/why-you-should-use-content-delivery-network (Year: 2015).*

* cited by examiner

*Primary Examiner* — Ruolei Zong

(57) ABSTRACT

Examples described herein relate to apparatuses and methods for a Content Distribution Network (CDN) node of a CDN to facilitate communication among two or more clients, including but not limited to determining, by the CDN node, that the two or more clients are connected to the CDN node for accessing content data originating from an origin server, receiving, by the CDN node, a message from a first client of the two or more clients, the message is to be routed to at least one second client of the two or more clients, and sending, by the CDN node, the message to the at least one second client without routing the message to the origin server.

20 Claims, 6 Drawing Sheets

CDN-BASED CLIENT MESSAGING

BACKGROUND

A Content Delivery Network (CDN) is a geographically distributed network of servers (each of which is a CDN node) for facilitating an origin server to distribute content data of the origin server to clients that consume the content data. To distribute the content data from the origin server to clients that are remote to the origin server, a CDN node in geographical proximity to the clients can provide the content data to those clients on behalf of the origin server. In particular, the CDN node can replicate and cache the content data of the origin server and provide the replicated and cached content data to the clients. Data traffic originating from the clients is delivered to the origin server, for example, if the origin server is providing online gaming experience to the clients. In the instances in which such data traffic includes messages sent by an origin client for other clients in close proximity to the origin client, sending the messages to the origin server and then routing the messages from the origin server to the intended recipient clients result in poor latency, thus degrading user experience. The degradation in user experience is especially pronounced if the messages require rapid responses from the recipient clients, such as in the case of real-time online gaming.

BRIEF SUMMARY

Provided herein are systems, apparatuses, and methods for a Content Delivery Network (CDN) node to facilitate communication between a first client connected to the CDN node and at least one second client connected to the CDN node. Embodiments include a method for a CDN node of a CDN to facilitate communication among two or more clients. The method may include determining, by the CDN node, that the two or more clients are connected to the CDN node for accessing content data originating from an origin server, receiving, by the CDN node, a message from a first client of the two or more clients, wherein the message is to be routed to at least one second client of the two or more clients, and sending, by the CDN node, the message to the at least one second client without routing the message to the origin server.

Embodiments further allow facilitating, by the CDN node, the origin server to deliver the content data to the two or more clients. Facilitating the origin server to deliver the content data may include providing, by the CDN node, the content data to the two or more clients on behalf of the origin server, and receiving, by the CDN node, updates of the content data from the origin server. The two or more clients may be connected to the CDN node based on geographical proximity to the CDN node. The CDN node may be an edge node in the CDN, and, in some instances, the CDN is configured to deliver the content data originating from the origin server to the two or more clients.

Determining that the two or more clients are connected to the CDN node may include at least one of receiving, by the CDN node, a request to access the content data stored on the CDN node from each of the two or more clients, or authenticating, by the CDN node, each of the two or more clients. Embodiments further allow determining that the at least one second client is connected to the CDN node in response to receiving the message from the first client, wherein the message is sent to the at least one second client in response to determining that the at least one second client is connected to the CDN node. The at least one second client may be one of a client identified in the message, a group of two or more clients identified in the message, or every client of the two or more clients that is not the first client.

Embodiments further allow sending information about the first client to at least one other client connected to the CDN node. Embodiments also allow sending information about at least one other client connected to the CDN node to the first client. Information about the first client may be retrieved from the origin server.

The method may include determining that the two or more clients are geographically proximal to each other; and sending identification information about the two or more clients to the origin server to indicate that the two or more clients are geographically proximal to each other.

In accordance with another aspect, a CDN node of a CDN is provided. The CDN node may include a network device, a memory, and a processor configured to determine that two or more clients are connected to the CDN node for accessing content data originating from an origin server, receive a message from a first client of the two or more clients, wherein the message is to be routed to at least one second client of the two or more clients, and send the message to the at least one second client without routing the message to the origin server.

The two or more clients may be connected to the CDN node based on geographical proximity to the CDN node. The CDN node may be an edge node in the CDN, and, in some instances, the CDN is configured to deliver the content data originating from the origin server to the two or more clients. The processor may determine that the two or more clients are connected to the CDN node by performing at least one of receiving a request to access the content data stored on the CDN node from each of the two or more clients, or authenticating each of the two or more clients.

In accordance with one aspect, the processor is further configured to determine that the at least one second client is connected to the CDN node in response to receiving the message from the first client, and the processor is configured to send the message to the at least one second client in response to determining that the at least one second client is connected to the CDN node.

In accordance with another aspect, a non-transitory computer-readable medium is provided that includes computer-readable instructions such that, when executed, cause a processor of a CDN node of a CDN to determine that two or more clients are connected to the CDN node for accessing content data originating from an origin server, receive a message from a first client of the two or more clients, wherein the message is to be routed to at least one second client of the two or more clients, and send the message to the at least one second client without routing the message to the origin server.

In accordance with yet another aspect, a CDN node of a CDN includes means for determining that two or more clients are connected to the CDN node for accessing content data originating from an origin server, means for receiving a message from a first client of the two or more clients, wherein the message is to be routed to at least one second client of the two or more clients, and means for sending the message to the at least one second client without routing the message to the origin server.

These and other features, together with the organization and manner of operation thereof, will become apparent from the following detailed description when taken in conjunction with the accompanying drawings.

DETAILED DESCRIPTION

Arrangements described herein relate to systems, apparatuses, and methods for a Content Delivery Network (CDN) node to facilitate communication between a first client connected to the CDN node and at least one second client connected to the CDN node. The CDN node is a part of a CDN configured to deliver content data of an origin server to clients connected to the CDN node. The first client and the at least one second client are connected to the CDN node responsive to successful authentication in some arrangements. Messages or other suitable types of client-generated data originating from the first client and intended to be received by the at least one second client is routed by the CDN node directly to the at least one second client, instead of routing the messages to the origin server (where the messages are then routed to the at least one second client).

The CDN node can route messages from one origin client to one recipient client (e.g., in an "1:1" format), route messages from one origin client to a designated group of multiple recipient clients (e.g., in an "1:many" format), route messages from one origin client to all clients connected to the CDN node (e.g., in an "1:all" format), or route messages from multiple origin clients to multiple recipient clients (e.g., in an "many:many" format).

Such messaging mechanisms leverage a geographically distributed nature of the CDN to allow efficient message routing to the intended recipients with improved latency.

Accordingly, rapid message sharing among clients that benefit from services provided by the origin server can be achieved, with the CDN offloading the messaging processes from the origin server. This type of arrangements can be implemented to improve Peer-to-Peer (P2P) interactions in the client base of the services provided by the origin server, where latency is critical for such interactions. Illustrating with a non-limiting example, latency in online, real-time, multiplayer gaming can be drastically improved. General messaging applications such as but not limited to, online dating applications and social networking applications, can also benefit from the arrangements described herein given that location is a prime filter for discovering other users in a given vicinity. Thus, in general, the CDN node can provide location-based services to the clients connected to that CDN node, where the location-based services are components of the services provided by the origin server.

Figure 1:
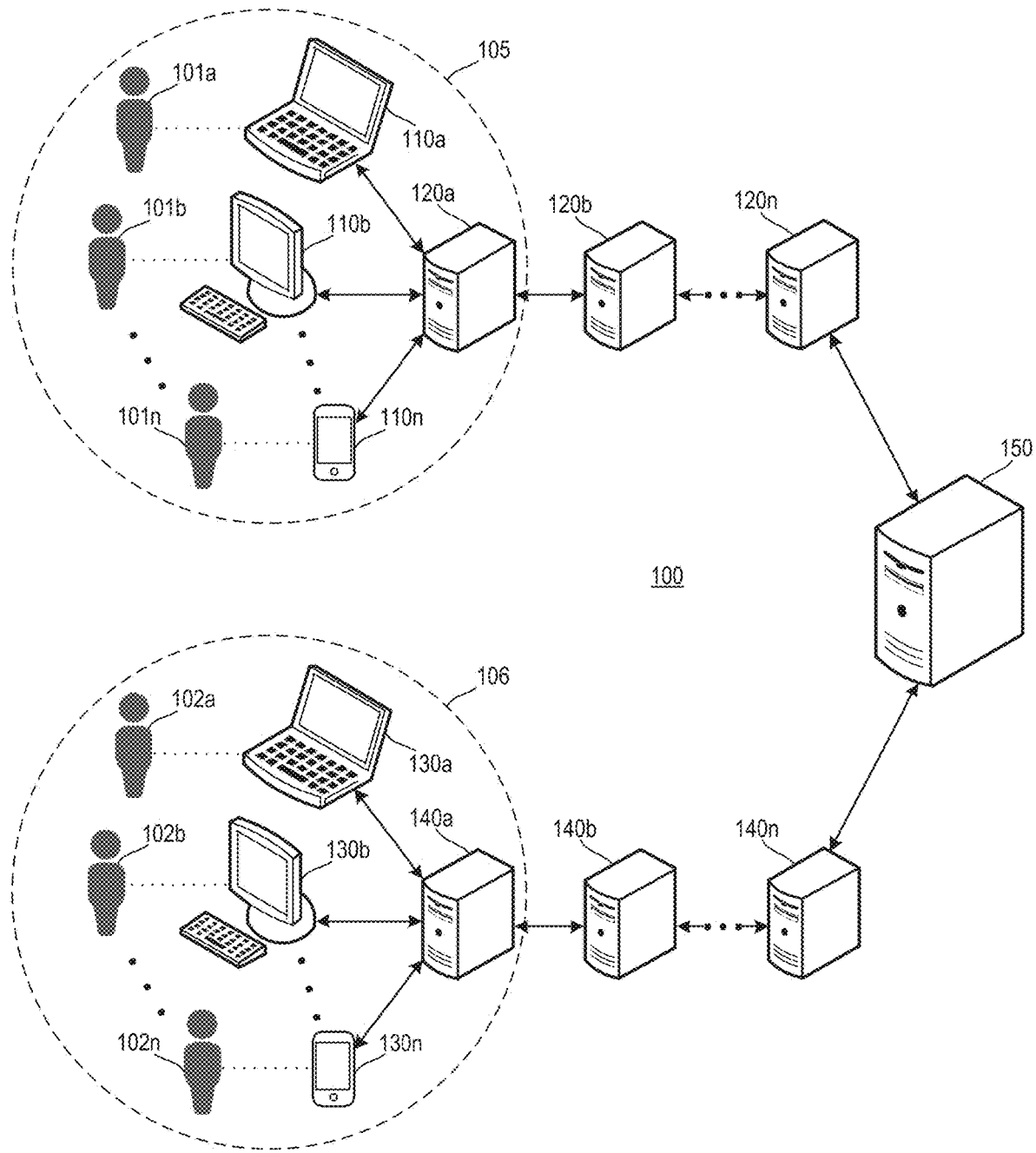
FIG. 1 is a diagram of a system for delivering content data of an origin server to various clients according to some embodiments of the present disclosure.

FIG. 1 is a diagram of a system 100 for delivering content data of an origin server 150 to various clients 110a-110n and 130a-130n according to some arrangements. Referring to FIG. 1, users 101a-101n and 102a-102n operate the clients 110a-110n and 130a-130n. In some scenarios, the users 101a-101n and 102a-102n engage a vendor associated with the origin server 150 to receive services corresponding to the content data. In some arrangements, the users 101a-101n and 102a-102n have accounts hosted and managed by the origin server 150. Each account may be associated with a scope of access and user information for each of the users 101a-101n and 102a-102n. The accounts can be subscription-based or free in some examples.

As shown, each of the users 101a-101n and 102a-102n operates or is associated with a respective one of the clients 110a-110n and 130a-130n for accessing the services provided by the origin server 150. In some arrangements, each of the clients 110a-110n and 130a-130n includes at least a processing circuit, a network device, and a user interface. The processing circuit is configured to perform functions of the clients 100a-110n and 130a-130n described herein. The network device is configured to connect the clients 110a-110n and 130a-130n to a CDN node (e.g., a CDN node 120a and a CDN node 140a). The user interface is configured to output (e.g., display) the content data (e.g., media content, games, information, and the like) of the origin server 150 to the users 101a-101n and 102a-102n as well as receiving user input from the users 101a-101n and 102a-102n. In some examples, each of the clients 110a-110n and 130a-130n can be a desktop computer, mainframe computer, laptop computer, pad device, smart phone device, or the like, configured with hardware and software to perform operations described herein.

The system 100 includes a CDN for delivering and distributing the content data originating from the origin server 150 to the clients 110a-110n and 130a-130n. The CDN includes CDN nodes 120a-120n and 140a-140n. The content data of the origin server 150 is replicated and cached in multiple locations throughout the CDN, such as in one or more of the nodes 120a-120n and 140a-140n. The origin server 150 refers to the source of the contents data. Examples of the content data include but are not limited to, webpages and web objects (e.g., text, graphics, scripts, and the like), downloadable objects (e.g., media files, software, documents, and the like), live streaming media, on-demand streaming media, social networks, and applications (e.g., online multiplayer games, dating applications, e-commerce applications, portals, and the like).

The nodes 120a-120n form a "backbone" of the CDN, providing a path from the origin server 150 to the end users (e.g., the clients 110a-110n). Similarly, the nodes 140a-140n form another backbone of the CDN, providing a path from the origin server 150 to the end users (e.g., the clients 130a-130n). The CDN nodes making up a backbone may be dynamically or statically selected based on the location of those CDN nodes, taking into consideration a number hops or links from the origin server 150 to the end users, latency, availability, cost, and other suitable criteria.

In some arrangements, the CDN nodes 120a and 140a are referred to as "edge nodes," given the proximity of the CDN nodes 120a and 140a to the end users (e.g., the clients 110a-110n and 130a-130n, respectively). For example, the clients 110a-110n that are in a first area 105 may be associated with the CDN node 120a. The clients 130a-130n that are in a second area 106 may be associated with the CDN node 140*a*. In other words, the CDN nodes 120*a* and 140*a* are on the edges of the CDN, and the CDN nodes 120*a* and 140*a* are directly connected to the clients 110*a*-110*n* and 130*a*-130*n*, respectively. Typically, the closer an edge CDN node is to clients connected thereto, the less latency those clients experience with respect to receiving the content data from that edge CDN node. Thus, performance is contingent upon the geographical proximity of the edge CDN node to the clients. CDN providers typically place the edge nodes as close to intended clients as possible. In some arrangements, an edge node may be directly connected to the origin server 150.

In some arrangements, the CDN nodes 120*b*-120*n* and 140*b*-140*n* are referred to as "intermediate nodes." The intermediate nodes 120*b*-120*n* and 140*b*-140*n* link the edge nodes 120*a* and 140*a* to the origin server 150 via various network links or "hops." The intermediate nodes 120*b*-120*n* and 140*b*-140*n* can provide updates of the content data cached on the edge nodes 120*a* and 140*a*. That is, the origin server 150 can send the updates to the edge nodes 120*a* and 140*a* through the intermediate nodes 120*b*-120*n* and 140*b*-140*n*. The intermediate nodes 120*b*-120*n* and 140*b*-140*n* relay the updates originating from the origin server 150 to the CDN nodes 120*a* and 140*a*. One of the intermediate nodes 120*b*-120*n* may be the same as one or more of the intermediate nodes 140*b*-140*n*, by virtue of a manner in which the CDN nodes are geographically distributed.

In some arrangements, the CDN nodes 120*a* and 140*a* provide the content data corresponding to services provided by the origin server 150 to the clients 110*a*-110*n* and 130*a*-130*n*, respectively. This may be referred to as delivery of static content data to the end users 101*a*-101*n* and 102*a*-102*n*. The CDN nodes 120*a* and 140*a* (as well as the CDN nodes 120*b*-120*n* and 140*b*-140*n*) essentially provide the content data on behalf of the origin server 150. For example, the CDN node 120*a* can send the content data cached thereon to the clients 110*a*-110*n* that request the data. Similarly, the CDN node 140*a* can send the content data cached thereon to the clients 130*a*-130*n* that request the data.

Each link between one of the clients 110*a*-110*n* and 130*a*-130*n* and a respective one of the CDN nodes 120*a* and 140*a* represents a suitable network connection. In addition, each link between two of the CDN nodes 120*a*-120*n* represents a suitable network connection, and each link between two of the CDN nodes 140*a*-140*n* represents a suitable network connection. Furthermore, a link between the CDN node 120*n* and the origin server 150 represents a suitable network connection, and a link between the CDN node 140*n* and the origin server 150 represents a suitable network connection.

A network connection is structured to permit the exchange of data, values, instructions, messages, and the like among the clients 110*a*-110*n* and 130*a*-130*n*, the CDN nodes 120*a*-120*n* and 140*a*-140*n*, and the origin server 150 in the manner shown. The network connection can be any suitable Local Area Network (LAN) or Wide Area Network (WAN) connection. For example, each network link can be supported by Frequency Division Multiple Access (FDMA), Time Division Multiple Access (TDMA), Synchronous Optical Network (SONET), Dense Wavelength Division Multiplexing (DWDM), Optical Transport Network (OTN), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like.

Each of the clients 110*a*-110*n* and 130*a*-130*n* can generate messages intended to be received by other clients (e.g., other ones of the clients 110*a*-110*n* and 130*a*-130*n*) that are also consuming the content data provided by a same edge CDN node. As referred to herein, a message refers to any communication (e.g., signals, indicators, values, parameters, and the like) from one client to another client. Conventionally, such messages are routed to the origin server 150 (with or without facilitation by the CDN), and the origin server 150 then routes the messages to the intended recipients (with or without facilitation by the CDN). Such mechanisms introduce unwanted latency because the origin server 150 is involved. Arrangements described herein allow a CDN node (e.g., the CDN node 120*a* or CDN node 140*a*) to route a message from one client connected to that CDN node directly to at least another client also connected to that CDN node.

Figure 2:
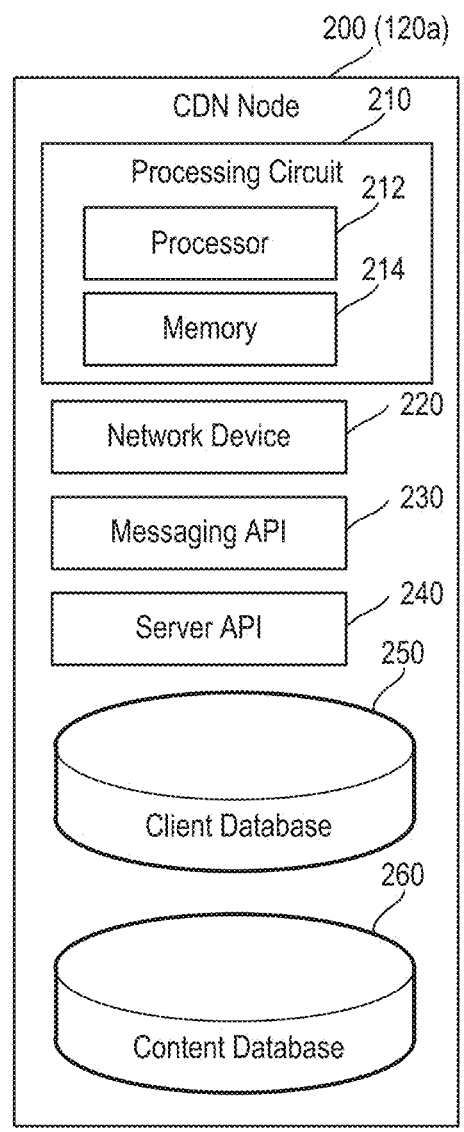
FIG. 2 is a block diagram that illustrates a Content Delivery Network (CDN) node according to some embodiments of the present disclosure.

FIG. 2 is a block diagram that illustrates a CDN node 200 according to some arrangements. Referring to FIGS. 1-2, the CDN node 200 is a non-limiting example of the CDN nodes 120*a* in some arrangements. In further arrangements, the CDN node 200 can be any of the CDN nodes 120*a*-120*n* and 140*a*-140*n*. In some arrangements, the CDN node 200 is an edge node of the CDN that is connected to end users' devices (e.g., the clients 110*a*-110*n* and 130*a*-130*n*). As shown, the CDN node 200 includes one or more of a processing circuit 210, a network device 220, a messaging Application Program Interface (API) 230, a server API 240, a client database 250, and a content database 260.

The processing circuit 210 is configured to perform various functions described herein relative to the CDN node 200. The processing circuit 210 includes a processor 212 and a memory 214. The processor 212 can be implemented with a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 214 can be implemented with a Random Access Memory (RAM), Read-Only Memory (ROM), Non-Volatile RAM (NVRAM), flash memory, hard disk storage, or another suitable data storage unit. The memory 214 stores data and/or computer code for facilitating the various processes executed by the processor 212. Moreover, the memory 214 is or includes tangible, non-transient volatile memory or non-volatile memory. Accordingly, the memory 214 includes database components, object code components, script components, or any other type of information structure for supporting the various functions described herein.

The network interface 220 is structured to establish communication with clients (e.g., the clients 110*a*-110*n* and 130*a*-130*n*), other CDN nodes (e.g., the CDN nodes 120*b* and 140*b*), and/or an origin server (e.g., the origin server 150). The network interface 220 includes hardware and software for achieving such. In some implementations, the network interface 220 includes a cellular transceiver (configured for cellular standards), a local wireless network transceiver (for 802.11X, ZigBee, Bluetooth, Wi-Fi, or the like), a wired network interface, a combination thereof (e.g., both a cellular transceiver and a Bluetooth transceiver), and/or the like.

The processing circuit 210 or another suitable processing entity can implement the messaging API 230. In such embodiments, the messaging API 230 is configured to interface with clients (e.g., the clients 110a-110n and 130a-130n) to route messages from at least one origin client to at least one recipient client. In particular, the messaging API 230 provides protocols and routines for receiving a message from an origin client (e.g., the client 110a) and sending the message to a recipient client (e.g., the client 110b).

The processing circuit 210 or another suitable processing entity may implement the server API 240. In such embodiments, the server API 240 is configured to interface with the origin server 150 to authenticate clients attempting to connect to the CDN node 200, retrieve information about the clients connected to the CDN node 200 from the origin server 150, relay messages to the origin server 150 after the messages are routed, among other interactions with the origin server 150.

The client database 250 is a memory device having data structures implemented to organize and store information about the clients that are currently connected to the CDN node 200. In some arrangements, the client database 250 is configured to store information about clients that had previously connected to the CDN node 200. In some arrangements, the information about the clients includes information that allow the CDN node 200 to identify the clients currently or previously connected to the CDN node 200. For example, a client can be identified by an Internet Protocol (IP) address, a username used for authentication with the origin server 150, or another suitable identifier. In some arrangements, the CDN node 200 can assign an identifier for each client connected thereto. In some arrangements, the origin server 150 or the client assigns an identifier for the client and sends the identifier to the CDN node 200.

The content database 260 caches the content data originating from the origin server 150. The content database 260 can also store updates of the content data from the origin server 150.

Figure 3:
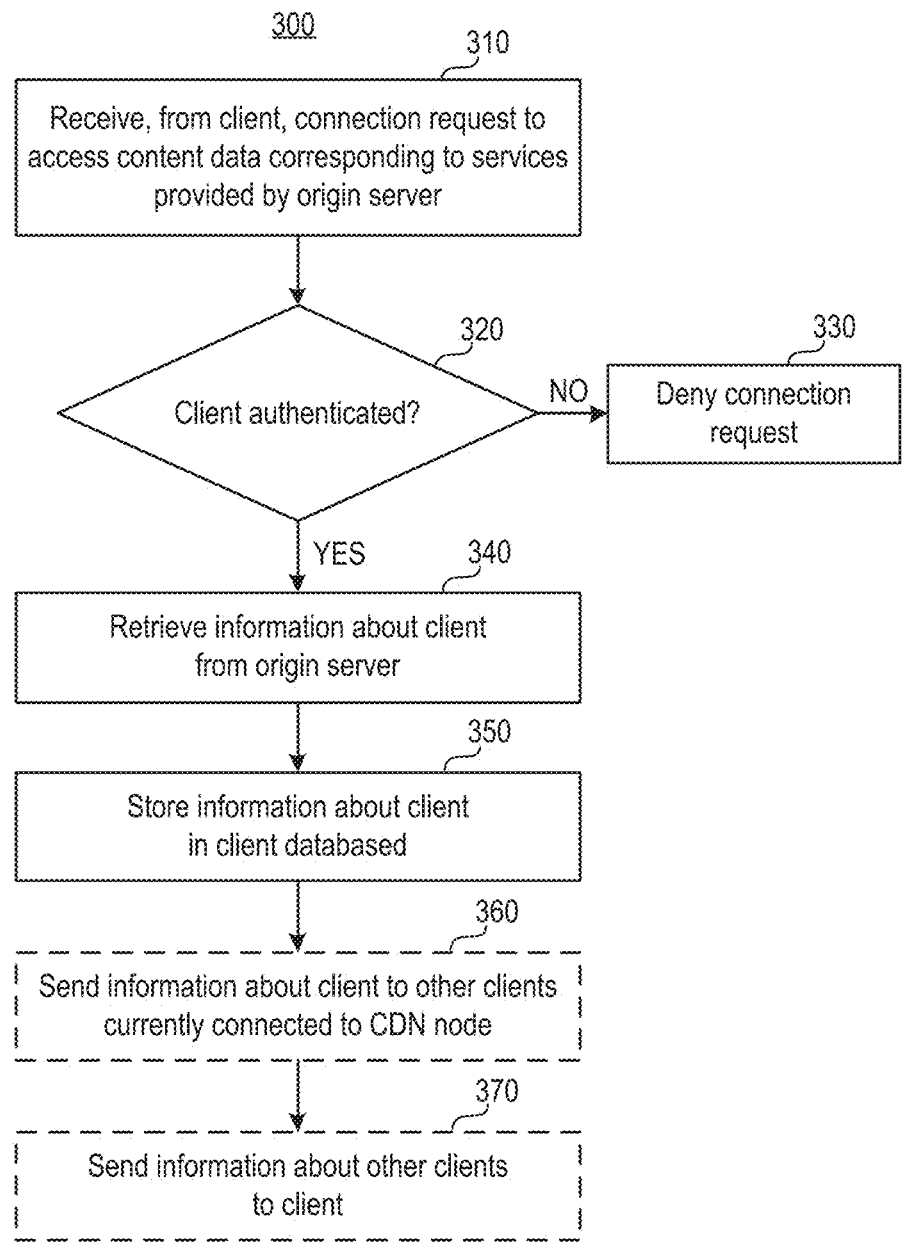
FIG. 3 is a flow diagram illustrating a method for a CDN node to connect with and authenticate a client according to some embodiments of the present disclosure.

FIG. 3 is a flow diagram illustrating a method 300 for a CDN node to connect with and authenticate a client according to various arrangements. Referring to FIGS. 1-3, the method 300 is concerned with a CDN node (e.g., the CDN node 120a, as implemented with the CDN node 200) connecting to and authenticating a client (e.g., the client 110a) that is geographically proximal to the CDN node 120a.

At 310, the CDN node 120a receives, from the client 110a, a connection request to the CDN node 120a to access content data corresponding to services provided by the origin server 150. The content data is cached in the content database 260 of the CDN node 120a in some arrangements. A browser or an application on the client 110a can send a Domain Name System (DNS) request, which specifies a domain associated with the origin server 150 (which is served by the CDN), to a DNS server (not shown). The DNS server performs a lookup based on geographical location of the client 110a to determine that the domain of the origin server 150 is handled by the CDN node 120a within the first area 105 (also taking into account other considerations such as availability and load-balancing). The DNS server then sends the client 110a an IP address of the CDN node 120a. The client 110a sends the connection request to the CDN node 120a using the IP address of the CDN node 120a. In some examples, the connection request includes an identifier (e.g., an IP address of the client 110a) that identifies the client 110a.

At 320, the CDN node 120a determines whether the client 110a is authenticated. In some arrangements, the authentication mechanism employed by the CDN node 120a can leverage the authentication mechanism employed by the origin server 150. For example, the client 110a may be required to send authentication credentials (e.g., username, password, biometrics, or the like) to the origin server 150 to be authenticated by the origin server 150, before the content data can be provided to the client 110a. In some examples, the CDN node 120a receives the authentication credentials from the client 110a and relays the authentication credentials to the origin server 150 through the CDN. In other examples, the client 110a can send the authentication credentials to the origin server 150 without using the CDN. Responsive to receiving the connection request, the server API 240 of the CDN node 120a transmits an authentication status request to the origin server 150. The authentication status request includes an identifier (e.g., an IP address) of the client 110a for the purpose of identification.

Alternatively, authentication at block 320 can be performed based on client authentication information stored in the client database 250 about the clients 110a-110n and/or the users 101a-110n, among other clients/users. For example, client authentication information can be stored in the client database 250, such that responsive to receiving the connection request from the client 110a at 310, the CDN node 120a authenticates the authentication credentials included in the connection request based on the client authentication information stored in the client database 250. As such, the CDN node 120a can leverage application-level knowledge at the CDN node 120a. Illustrating with a non-limiting example involving a game that assigns players into teams or into games, the CDN node 120a with knowledge that the clients 110a-110n are connected thereto can assist the origin server 150 in determining the teams/games based on geographical attributes, because the clients 110a-110n connected to the same CDN node 120a are deemed to be in geographical proximity. The CDN node 120a can send information (e.g., the usernames) about the clients 110a-110n to the origin server 150 for dividing players into teams/games. For instance, the CDN node 120a can identify one or more of the clients 110a-110n to be assigned to a same team/game, where one or more of the clients 130a-130n may be identified to be in a different team/game. In another example, the CDN node 120a can identify some of the clients 110a-110n to be on one team of a game and others of the clients 110a-110n may be on another team of the same game.

If the client 110a is authenticated, the CDN node 120a receives an authentication success message from the origin server 150. On the other hand, if the client 110a fails to authenticate, the CDN node 120a receives an authentication failure message from the origin server 150.

In response to determining that the client 110a has not been authenticated (320:NO), the CDN node 120a denies the connection request at 330. For example, the messaging API 230 transmits a connection denied message to the client 110a. The client 110a cannot be allowed to utilize the messaging capabilities of the CDN node 120a unless the client 110a is authenticated.

On the other hand, in response to determining that the client 110a has been authenticated (320:YES), the CDN node 120a retrieves information about the client 110a from the origin server 150 at 340. For example, the server API 240 queries the origin server 150 for the information about the client 110a. The information includes one or more of types of communications that the CDN node 120a can handle for the client 110a and additional identifiers (e.g., username, account number, screenname, player name, and the like) that identifies the client 110a. The CDN node 120a can store the information about the client 110a in the client database 250, at 350.

At 360, the CDN node 120a can send information about the client 110a to other clients (e.g., one or more of clients 110b-110n) currently connected to the CDN node 120a. This allows the other clients to have notice that the client 110a is now connected to the CDN node 120a. The information about the client 110a includes at least an identifier (e.g., IP address, username, account number, screenname, player name, and the like) that identifies the client 110a. At 370, the CDN node 120a can send information about other clients (e.g., one or more of clients 110b-110n) currently connected to the CDN node 120a to the client 110a. This allows the client 110a to have knowledge of what other clients are also connected to the CDN node 120a. The information about the other clients includes at least an identifier (e.g., IP address, username, account number, screenname, player name, and the like) that identifies each of the other clients. Such exchange of information allows the clients 110a-110n connected to the CDN node 120a to message each other using the information (e.g., the identifiers). In some arrangements, one or both of blocks 360 or 370 are optional.

Although blocks 340-370 are shown in sequence, one of ordinary skill in the art can appreciate that 340-370 can be executed in any suitable order or simultaneously.

Figure 4:
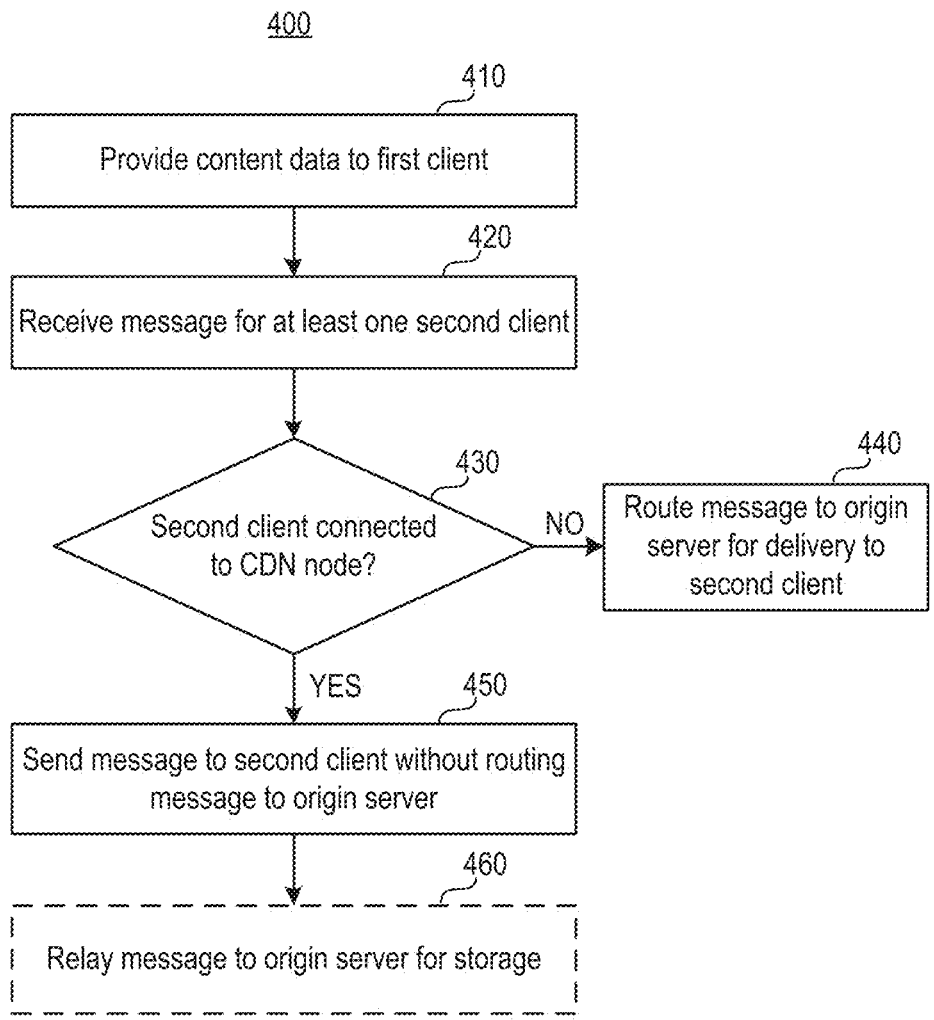
FIG. 4 is a flow diagram illustrating a method for a CDN node to facilitate communication between clients connected to the CDN node according to some embodiments of the present disclosure.

FIG. 4 is a flow diagram illustrating a method 400 for a CDN node to facilitate communication between clients connected to the CDN node according to various arrangements.

Referring to FIGS. 1-4, the method 400 is concerned with a CDN node (e.g., the CDN node 120a, as implemented with the CDN node 200) routing a message from a first client to at least one second client. The first client refers to any arbitrary client (e.g., the client 110a) that sends a message to at least another client. The second client refers to any arbitrary client (e.g., the client 110b) that is an intended recipient of the message sent from the first client.

At 410, the CDN node 120a provides the content data to the first client. For example, the first client is connected to and authenticated by the CDN node 120a per the method 300. In particular, responsive to successful authentication (320:YES), the CDN node 120a can begin sending the locally cached content data to the first client.

At 420, the CDN node 120a receives, from first client, a message for the at least one second client. The message can be received by the messaging API 230 in some arrangements.

Figure 5:
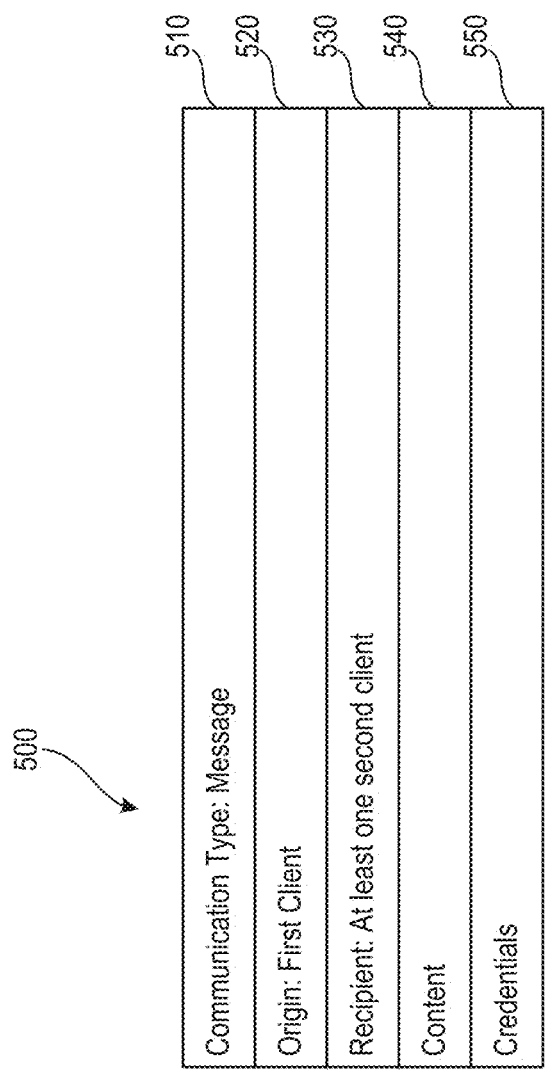
FIG. 5 is a block diagram illustrating a message according to some embodiments of the present disclosure.

An example message 500 is shown in FIG. 5. Referring to FIGS. 1-5, the message 500 includes one or more of blocks 510-550. For example, the message 500 includes a communication type 510 in some arrangements. The CDN node 120a can determine whether the CDN node 120a can handle the message 500 with the communication type 510 based on any rules or policy received from the origin server 150 as a part of the information retrieved from the origin server 150, for example, at 340. The message 500 includes an origin identifier 520 in some arrangements. The origin identifier 520 identifies the first client. The origin identifier 520 includes one or more of an IP address, username, account number, screenname, player name, and the like. The message 500 includes a recipient identifier 530 in some arrangements. The recipient identifier 530 identifies each of the at least one second client. The recipient identifier 530 includes one or more of an IP address, username, account number, screenname, player name, and the like corresponding to each of the at least one second client. The first client has knowledge of the other recipients connected to the CDN node 120a by virtue of block 370. In some arrangements, the recipient identifier 530 may include a value indicating whether the message 500 is to be sent to all other clients connected to the CDN node 120a. The message 500 includes content 540 in some arrangements. Examples of the content 540 include an in-game or in-application text message, a user action (e.g., an action in a game or an application) received via an user input element of the first client, or other types of communication for the at least one second client. The message 500 includes credentials 550 in some arrangements. The CDN node 120a can authenticate the message 500 as from the first recipient (previously authenticated) based on the credentials 550.

At 430, the CDN node 120a can determine whether each of the at least one second client is currently connected to the CDN node 120a. For each of the at least one second client identified by the corresponding recipient identifier 530, the CDN node 120a searches the client database 250 based on the recipient identifier 530 to determine whether the corresponding second client is currently connected to the CDN node 120a. If a particular requested second client is not currently connected to the CDN node 120a, it may be the case that that second client has disconnected since the first recipient received the information about that second client.

For each of the at least one second client, responsive to determining that the second client is not currently connected to the CDN node 120a, the CDN node 120a (e.g., the server API 240) routes the message 500 to the origin server 150 for delivery to the second client, at 440. In some arrangements, instead of routing the message 500 to the origin server 150, the CDN node 120a may send a failure message to the first client indicating that the second client is not currently connected to the CDN node 120a. Responsive to determining that the second client is currently connected to the CDN node 120a, the CDN node 120a (e.g., the messaging API 230) sends the message 500 to the second client without routing the message 500 to the origin server 150, at 450.

At 460, the CDN node 420 (e.g., the server API 240) can relay the message 500 to the origin server 150 for storage. Block 460 is optional in some arrangements. Block 460 may be executed after or concurrent with block 450, given that sending the message 500 for recordkeeping is not as urgent as sending the message 500 to the intended recipient(s) in real-time. In some arrangements, block 460 can be executed periodically, such that messages from the clients 110a-110n are grouped and sent in bulk to the origin server 150 periodically, to conserve bandwidth. In some arrangements, instead of messages or in addition to the messages, metadata such as but not limited to which accounts/clients are connected and duration of such connection are sent to the origin server 150.

In various arrangements, blocks 420-460 can be executed while the CDN node 120a is providing the content data to the first client.

Figure 6:
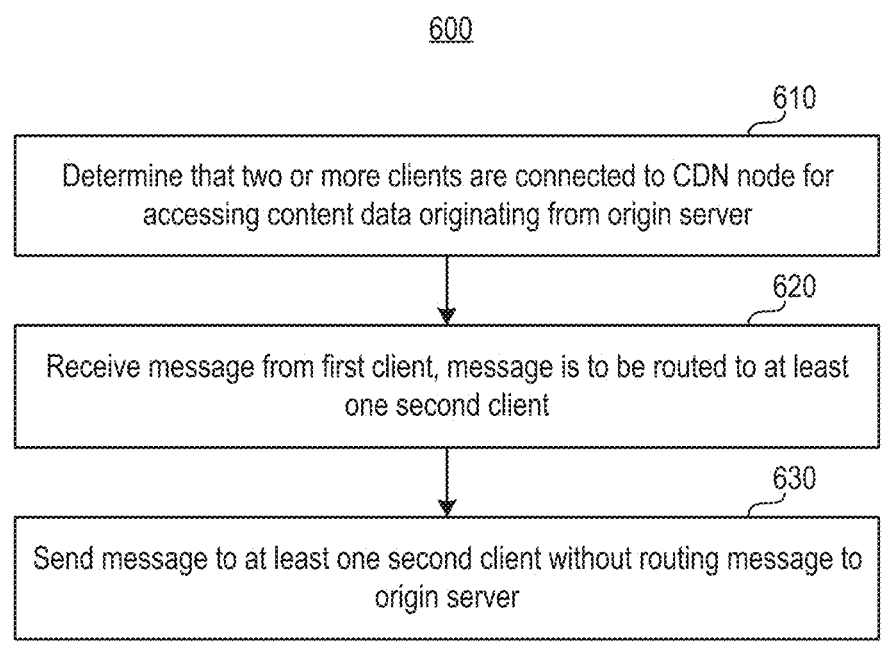
FIG. 6 is a flow diagram illustrating a method for a CDN node to facilitate communication among two or more clients connected to the CDN node according to some embodiments of the present disclosure.

FIG. 6 is a flow diagram illustrating a method 600 for a CDN node to facilitate communication among two or more clients connected to the CDN node according to various arrangements. Referring to FIGS. 1-6, the method 600 is concerned with an edge CDN node (e.g., the CDN node 120a, as implemented with the CDN node 200) routing a message from a first client (e.g., the client 110a) to at least one second client (e.g., the client 110b). Each of blocks 610-630 corresponds to one or more of blocks 310-370 and 410-460.

At 610, the CDN node 120a determines that two or more clients (including, for example, the clients 110a and 110b) are connected to the CDN node 120a for accessing the content data originating from the origin server 150. Each of the two or more clients is directed to the CDN node 120a by a DNS server (based on geographical proximity of the clients to the CDN node 120a) for accessing the content data stored in the content database 260 of the CDN node 120a. In other words, the CDN node 120a facilitates the origin server 150 to deliver the content data to the two or more clients, for example, by providing the content data to the two or more clients on behalf of the origin server 150. The CDN node 120a can receive updates of the content data from the origin server 150. The client database 250 of the CDN node 120a maintains a list of clients that are currently connected to the CDN node 120a.

Each of the two or more clients is connected to and authenticated by the CDN node 120a. For example, the CDN node 120a receives a connection request to access the content data stored in the content database 260 from each of the two or more clients, and/or authenticates each of the two or more clients in the manner described.

At 620, the CDN node 120a receives a message (e.g., the message 500) from a first client (e.g., the client 110a). The message is to be routed to at least one second client (e.g., the client 110b). Upon receiving the message, the CDN node 120a can determine that the at least one second client is connected to the CDN node 120a by searching the client database 250 using a recipient identifier that identifies each of the at least one second client. The recipient identifier can be the recipient identifier 530 of the message 500 in some examples.

In some examples, the at least one second client is one of the clients connected to the CDN node 120a as identified in the message (e.g., in the recipient identifier 530 portion of the message 500). In some examples, the at least one second client is a group of two or more clients connected to the CDN node 120a as identified in the message (e.g., in the recipient identifier 530 portion of the message 500). In some examples, the at least one second client refers to all clients connected to the CDN node 120a that is not the first client, as identified in the message (e.g., in the recipient identifier 530 portion of the message 500). Alternatively, the message indicates that the message is to be broadcasted by the CDN node 120a to all clients connected to the CDN node 120a, without specifying an identifier for each client. Such implementations can be useful in e-commerce situations in which a short-term special offer by one client is to be broadcasted to other nearby clients.

At 630, the CDN node 120a sends the message to each of the at least one second client without routing the message to the origin server 150. In some arrangements, responsive to determining that one of the at least one second client is connected to the CDN node 120a, the message is sent to that second client.

In some arrangements, the CDN node 120a can determine that the clients that are currently connected to the CDN node 120a are geographically proximal to each other. By virtue of the fact that the DNS server assigns clients to the CDN node 120a based at least in part on geographical locations of the clients (e.g., clients within the first area 105 are typically assigned to the CDN node 120a), the CDN node 120a can determine that all clients currently connected to the CDN node 120a are geographically proximal to each other. The CDN node 120a can send identification information (e.g., IP addresses, username, account number, screenname, player name, and the like) about the clients to the origin server 150. The origin server 150 can leverage such data to determine geographical proximity of the users for providing the services. For example, in lieu of using location data (e.g., Global Positioning System (GPS) data) sent from the clients 110a-110n to determine that the clients 110a-110n are geographical proximal to one another, the origin server 150 can determine that the clients 110a-110n are geographical proximal to each other because the clients 110a-110n are all currently connected to the same CDN node 120a. The origin server 150 can use such data for features such as detecting nearby users for online dating applications, matchmaking for players of an online multiplayer game, and the like.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 212(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, ASICs, FPGAs, DSPs, or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method for a Content Distribution Network (CDN) node of a CDN to facilitate communication among two or more clients, the method comprising:
   determining, by the CDN node of the CDN, that the two or more clients are connected to the CDN node for accessing content data originating from an origin server;
   providing, by the CDN node of the CDN, the content data originating from the origin server to the two or more clients;
   receiving, by the CDN node of the CDN, a message from a first client of the two or more clients, wherein the message is to be routed to at least one second client of the two or more clients, wherein the message comprises client-generated data originating from the first client and intended for the at least one second client, and wherein the client-generated data is different from the content data and the content data is absent from the message; and
   based on determining that the two or more clients are connected to the CDN node of the CDN, sending, by the CDN node of the CDN, the message to the at least one second client without routing the message to the origin server.

2. The method of claim 1, further comprising facilitating, by the CDN node, the origin server to deliver the content data to the two or more clients.

3. The method of claim 2, wherein facilitating the origin server to deliver the content data comprises:
   providing, by the CDN node, the content data to the two or more clients on behalf of the origin server; and
   receiving, by the CDN node, updates of the content data from the origin server.

4. The method of claim 1, wherein the two or more clients are connected to the CDN node based on geographical proximity of the two or more clients to the CDN node.

5. The method of claim 1, wherein:
   the CDN node is an edge node in the CDN; and
   the CDN is configured to deliver the content data originating from the origin server to the two or more clients.

6. The method of claim 1, wherein determining that the two or more clients are connected to the CDN node comprises at least one of:
receiving, by the CDN node, a request to access the content data stored on the CDN node from each of the two or more clients; or
authenticating, by the CDN node, each of the two or more clients.

7. The method of claim 1, further comprising determining that the at least one second client is connected to the CDN node in response to receiving the message from the first client, wherein the message is sent to the at least one second client in response to determining that the at least one second client is connected to the CDN node.

8. The method of claim 1, wherein the at least one second client is one of:
a client identified in the message;
a group of two or more clients identified in the message; or
every client of the two or more clients that is not the first client.

9. The method of claim 1, further comprising sending information about the first client to at least one other client connected to the CDN node.

10. The method of claim 1, further comprising sending information about at least one other client connected to the CDN node to the first client.

11. The method of claim 1, further comprising retrieving information about the first client from the origin server.

12. The method of claim 1, further comprising:
determining that the CDN node services a first area by delivering the content data from the origin server to at least one of the two or more clients;
determining the first client and the at least one second client are geographically proximal to each other based on the message and being connected to the CDN node within the first area; and
sending identification information about the first client and the at least one second client to the origin server to indicate that the two or more clients are geographically proximal to each other.

13. The method of claim 1, further comprising:
routing the message to the origin server after sending the message to the at least one second client, wherein routing the message is based on rules received from the origin server.

14. A Content Distribution Network (CDN) node of a CDN, comprising:
a network device;
a memory; and
a processor configured to:
determine that two or more clients are connected to the CDN node of the CDN for accessing content data originating from an origin server;
provide the content data originating from the origin server to the two or more clients;
receive a message from a first client of the two or more clients, wherein the message is to be routed, using the CDN node of the CDN, to at least one second client of the two or more clients, wherein the message comprises client-generated data originating from the first client and intended for the at least one second client, and wherein the client-generated data is different from the content data and the content data is absent from the message;
determine that the first client and the at least one second client are geographically proximal to each other based on the message; and
based on determining that the first client and the at least one second client are connected to the CDN node of the CDN, send the message to the at least one second client without routing the message to the origin server.

15. The CDN node of claim 14, wherein the two or more clients are connected to the CDN node based on geographical proximity to the CDN node.

16. The CDN node of claim 14, wherein:
the CDN node is an edge node in the CDN; and
the CDN is configured to deliver the content data originating from the origin server to the two or more clients.

17. The CDN node of claim 14, wherein the processor determines that the two or more clients are connected to the CDN node by performing at least one of:
receiving a request to access the content data stored on the CDN node from each of the two or more clients; or
authenticating each of the two or more clients.

18. The CDN node of claim 14, wherein the processor is configured to send the message to the at least one second client in response to determining that the first client and the at least one second client are geographically proximal to each other.

19. A non-transitory computer-readable medium comprising computer-readable instructions such that, when executed, cause a processor of a Content Distribution Network (CDN) node of a CDN to:
determine that two or more clients are connected to the CDN node of the CDN for accessing content data originating from an origin server;
provide the content data originating from the origin server to the two or more clients;
receive a message from a first client of the two or more clients, wherein the message is to be routed, using the CDN node of the CDN, to at least one second client of the two or more clients, wherein the message comprises client-generated data originating from the first client and intended for the at least one second client, and wherein the client-generated data is different from the content data and wherein the content data is absent from the message; and
based on determining that the two or more clients are connected to the CDN node of the CDN, send the message to the at least one second client without routing the message to the origin server.

20. A Content Distribution Network (CDN) node of a CDN, comprising:
means for determining that two or more clients are connected to the CDN node of the CDN for accessing content data originating from an origin server;
means for providing the content data originating from the origin sever to the two or more clients;
means for receiving a message from a first client of the two or more clients, wherein the message is to be routed, using the CDN node of the CDN, to at least one second client of the two or more clients, wherein the message comprises client-generated data originating from the first client and intended for the at least one second client, and wherein the client-generated data is different from the content data and the content data is absent from the message; and
based on determining that the two or more clients are connected to the CDN node of the CDN, means for sending the message to the at least one second client without routing the message to the origin server.

* * * * *